July 12, 1938.  F. W. GEHRKE  2,123,465
RANGE FINDER
Filed April 17, 1934
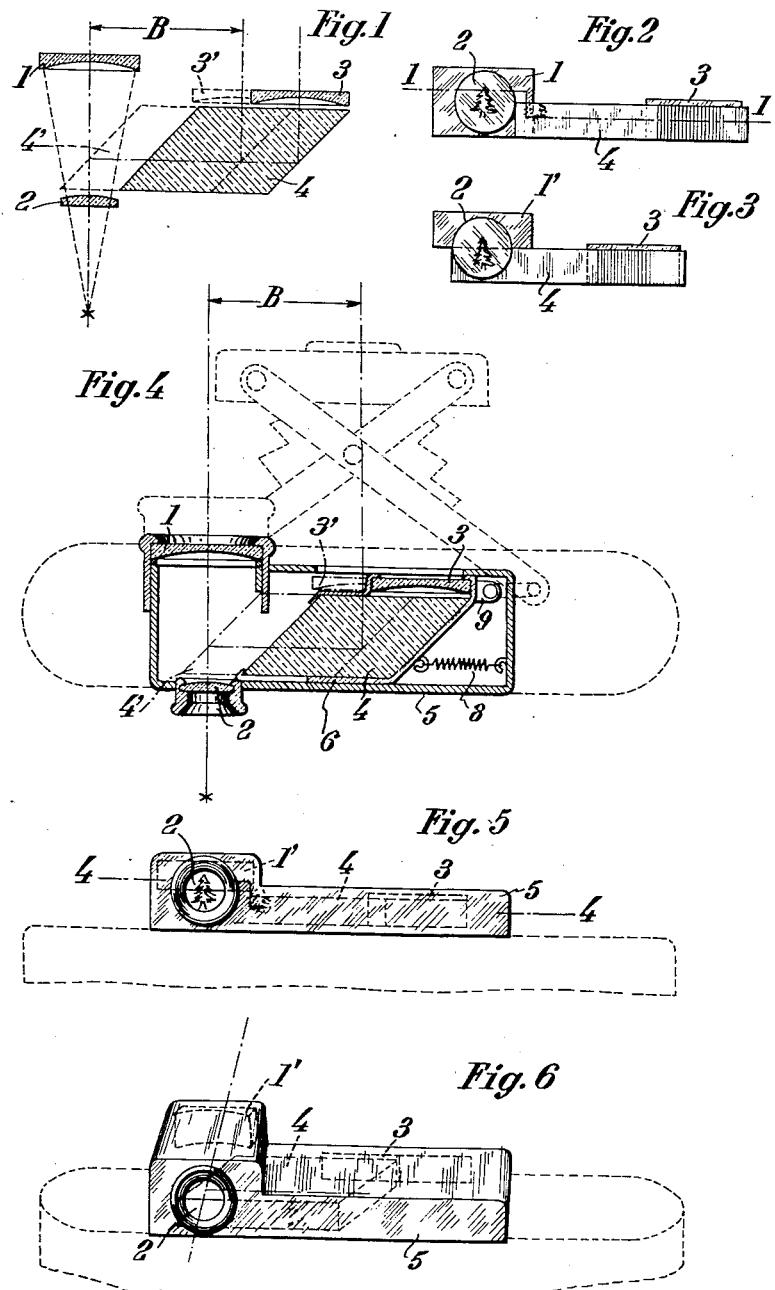
Inventor:
Friedrich Wilhelm Gehrke,
By Attorney
Philip S. Hopkins.

Patented July 12, 1938

2,123,465

UNITED STATES PATENT OFFICE 2,123,465

RANGE FINDER

Friedrich Wilhelm Gehrke, Munich, Germany, assignor to Agfa Ansco Corporation, Binghamton, N. Y., a corporation of New York Application April 17, 1934, Serial No. 721,054
In Germany April 20, 1933

2 Claims. (Cl. 95—44)

My present invention relates to a range finder. One of its objects is a process of measuring distances. Another object is a range finder. Still another object is a range finder which can be combined with a camera in a simple and efficient structure. Further objects will be seen from the detailed specification following hereafter.

The method hitherto practiced for measuring parallactic angles was to turn one of two mirror planes inclined at an angle of 45° to the optical axis of the camera until the object when viewed directly was in register with the image of the object reflected by the two mirrors. Another way was to compensate for the parallaxes by a controllable optical element (lens sections, cylinder lenses or wedges). The invention relates to this latter kind of distance measuring.

According to the present invention the parallactic angles are measured by displacing a negative lens or lens section mounted before the base of the range finder with relation to a positive lens placed behind the base of the range finder. Furthermore according to the invention the range finder is connected with a Galilean view finder. To this effect the prism which preferably forms the base of the whole instrument is mounted so as to be movable in direction of the base together with the negative lens not forming a part of the finder in such a manner that the Galilean view finder can be used alone or in connection with the range finder. The parallactic angles are measured by means of half the negative lens which is movable perpendicularly to the direction of vision and constitutes either the lower or the upper portion of the field of vision of the finder. The stationary positive lens may simultaneously be a part of the Galilean view finder and of the range finder.

The principal advantages of the new range finder according to the invention consist in the great and clear picture which is obtained by the arrangement of the lens elements. Due to its compact construction the range finder is particularly suited for use in photographic cameras. In addition, combining the range finder with a Galilean view finder provides the possibility of utilizing the finder alone or together with a range finder.

The invention will now be described with reference to the accompanying drawing in which Fig. 1 shows diagrammatically a section view of the finder and the range finder on the line 1—1 of Fig. 2, the latter being removed from the path of the rays of the finder;

Fig. 2 shows diagrammatically a front view of the arrangement shown in Fig. 1, the dotted position of the prism in Fig. 1 being omitted;

Fig. 3 shows diagrammatically a front view of a modification of the arrangement according to Fig. 2;

Fig. 4 shows diagrammatically a range finder mounted on a camera, the range finder being shown in horizontal section on line 4—4 of Fig. 5;

Fig. 5 shows a front view of the arrangement shown in Fig. 4, and

Fig. 6 shows a perspective view of the arrangement shown in Fig. 4, the same numerals designating the same parts.

1 is the negative lens system and 2 is the positive lens system of the Galilean finder. The negative lens 3 and the base-forming prism 4 are mounted so as to be movable with relation to the stationary positive lens 2. The prism as shown in dotted lines in Fig. 1, may be placed in the path of the rays projected through the Galilean view finder. The base of the range finder is marked B. From Figs. 2 and 3 it is apparent that the upper part of the image viewed through the finder is directly seen, i. e. straight through the finder, whereas the lower part is seen through the prism and the negative lens 3. The negative lens 3 must be displaced until the two images are in register. Fig. 3 shows a modification, wherein 1' is the upper part of negative lens 1. The lower part of lens 1 has been removed.

Figs. 4, 5 and 6 show the range finder according to this invention mounted on a camera. 1 is the negative lens system and 2 is the positive lens system of the Galilean finder. The prism 4 of the range finder is embraced by a mount 6 which also embraces the negative lens 3 of the finder but admits all the light rays necessary for distance measuring. Therefore the mount 6 embraces the prism in the embodiment shown in Figs. 4 to 6 only on its lower part. The mount 6 is pressed against an abutment 9 by means of the spring 8. The abutment 9 may be moved for the distances smaller than infinity by any suitable means coupled with the objective mount, for instance, as shown in Fig. 4 by one of the struts connecting the objective panel with the camera casing.

In order that with the desired long base of the range finder the negative lens of the Galilean finder be arranged at a sufficiently long distance from the eye-lens, without necessity of giving the camera, in direction of the optical axis, the extension of the Galilean finder, it is advisable to place the negative objective lens of the finder in a mount which may be extended in the way of a telescope as shown in Fig. 4.

What I claim is:

1. A range finder which comprises in combination, a positive lens system, a negative lens system arranged at a substantial distance in front of said positive lens system and limiting half of the picture field, said positive lens system and negative lens system forming a Galilean finder, a prism constituting a parallelopiped arranged laterally to said finder and limited by two planes inclined to the optical axis of said finder, a negative lens arranged before the inclined plane of said prism remote from said finder, said prism and said negative lens limiting the other half of the picture field, and means for displacing said prism and said negative lens laterally in and out of the field of said finder.

2. In combination with a camera, a finder which comprises in combination; a positive lens system, a negative lens system arranged at a substantial distance in front of said positive lens system so that both lens systems form a Galilean view finder, means for moving said negative lens system in direction of its optical axis, a prism constituting a parallelopiped arranged laterally to said finder limited by planes inclined to the optical axis of said finder, a negative lens arranged before the inclined plane of said prism remote from said finder, and means connected with the objective mount of said camera for displacing said prism and said negative lens laterally towards and away from said finder.

FRIEDRICH WILHELM GEHRKE.